United States Patent
Bastian et al.

(10) Patent No.: US 11,100,119 B2
(45) Date of Patent: Aug. 24, 2021

(54) DETERMINING DATA STRUCTURES FOR SPATIAL DATA BASED ON SPATIAL DATA STATISTICS

(71) Applicant: SAP SE, Walldorf (DE)

(72) Inventors: Kai-Niklas Bastian, Malsch (DE); Michael Jung, Angelbachtal (DE)

(73) Assignee: SAP SE, Walldorf (DE)

( * ) Notice: Subject to any disclaimer, the term of this patent is extended or adjusted under 35 U.S.C. 154(b) by 483 days.

(21) Appl. No.: 15/972,077

(22) Filed: May 4, 2018

(65) Prior Publication Data

US 2019/0340288 A1   Nov. 7, 2019

(51) Int. Cl.
| | | |
|---|---|---|
| *G06F 16/2458* | (2019.01) | |
| *G06F 16/25* | (2019.01) | |
| *G06F 16/903* | (2019.01) | |
| *G06F 17/18* | (2006.01) | |
| *G06F 16/29* | (2019.01) | |

(52) U.S. Cl.
CPC ........ *G06F 16/2462* (2019.01); *G06F 16/258* (2019.01); *G06F 16/90335* (2019.01); *G06F 17/18* (2013.01)

(58) Field of Classification Search
CPC .............. G06F 16/2462; G06F 16/258; G06F 16/90335; G06F 17/18; G06F 16/29
See application file for complete search history.

(56) References Cited

U.S. PATENT DOCUMENTS

| | | | |
|---|---|---|---|
| 8,175,845 B1* | 5/2012 | Muthukrishnan | G06F 16/283 |
| | | | 702/180 |
| 2003/0177197 A1* | 9/2003 | de Bonet | G06Q 50/12 |
| | | | 709/213 |
| 2006/0129529 A1* | 6/2006 | Adler | G06F 16/283 |
| 2015/0278310 A1* | 10/2015 | Kawabata | G06F 16/2456 |
| | | | 707/753 |
| 2015/0324373 A1* | 11/2015 | Tyercha | G06F 16/2237 |
| | | | 707/722 |
| 2017/0017686 A1* | 1/2017 | Feng | G06F 16/24545 |
| 2017/0345011 A1* | 11/2017 | Salami | G06Q 20/10 |
| 2019/0130277 A1* | 5/2019 | Andoni | G06N 3/0454 |

* cited by examiner

*Primary Examiner* — Mariela Reyes
*Assistant Examiner* — Fatima P Mina
(74) *Attorney, Agent, or Firm* — Fountainhead Law Group

(57) ABSTRACT

Some embodiments provide a non-transitory machine-readable medium that stores a program. The program identifies a first data structure having a first type. The first data structure is configured to store a set of geometries. The program further identifies a second data structure associated with the first data structure. The second data structure is configured to store modifications to the set of geometries. The program also perform a merge operation on the first data structure and the second data structure to form a third data structure.

17 Claims, 8 Drawing Sheets

| Geometry ID | Geometry |
|---|---|
| 1 | Point (0 0) |
| 2 | - |
| 3 | Point (1 1) |
| 4 | Point Empty |
| 5 | - |
| 6 | Point (42 43) |

| Data Structure | 2D Point | 3D Point | Empty Point | Polygon |
|---|---|---|---|---|
| 2D Point Container SD | Yes | No | Yes | No |
| 2D Point Container DD | Yes | No | Yes | No |
| Space Filling Curve | Yes | Yes | Yes | No |
| R-Tree Container | Yes | Yes | Yes | Yes |
| General Purpose Container | Yes | Yes | Yes | Yes |

FIG. 6

DETERMINING DATA STRUCTURES FOR SPATIAL DATA BASED ON SPATIAL DATA STATISTICS

BACKGROUND

Today, computing systems generate, manage, and store a rapidly increasing amount of data. Such data may include spatial data. Traditional databases may not be fit for managing spatial data. For instance, some databases cannot handle queries (or processes such queries very slowly) on spatial data. Other databases may not support spatial data types or spatial operations.

SUMMARY

In some embodiments, a non-transitory machine-readable medium stores a program executable by at least one processing unit of a device. The program identifies a first data structure having a first type. The first data structure is configured to store a set of geometries. The program further identifies a second data structure associated with the first data structure. The second data structure is configured to store modifications to the set of geometries. The program also perform a merge operation on the first data structure and the second data structure to form a third data structure by determining a first set of statistics data associated with the modifications to the set of geometries stored in the second data structure, retrieving a second set of statistics data associated with the set of geometries stored in the first data structure, determining a second type of data structure based on the first and second sets of statistics data, applying the modifications stored in the second data structure to the set of geometries stored in the first data structure to form a modified set of geometries, generating the third data structure having the second type, the third data structure configured to store the modified set of geometries, and storing the modified set of geometries in the third data structure.

In some embodiments, determining the second type of data structure based on the first and second sets of statistics data may include identifying a subset of a plurality of types of data structures based on the first and second sets of statistics data, determining cost values for each type of data structure in the subset of the plurality of types of data structures based on the first and second sets of statistics data, and determining a type of data structure from the subset of the plurality of types of data structures as the second type of data structure based on the determined cost values. The cost values for each type of data structure in the subset of the plurality of types of data structures may include a storage cost value and a set of query performance cost values. Determining the type of data structure from the subset of the plurality of types of data structures as the second type of data structure based on the determined cost values may include applying a defined weigh value to each query performance cost value in the set of query performance cost values.

In some embodiments, the modifications to the set of geometries may include an addition of a geometry to the set of geometries. The modifications to the set of geometries may include a removal of a geometry from the set of geometries. The first data structure may be immutable.

In some embodiments, a method identifies a first data structure having a first type. The first data structure is configured to store a set of geometries. The method further identifies a second data structure associated with the first data structure. The second data structure is configured to store modifications to the set of geometries. The method also performs a merge operation on the first data structure and the second data structure to form a third data structure by determining a first set of statistics data associated with the modifications to the set of geometries stored in the second data structure, retrieving a second set of statistics data associated with the set of geometries stored in the first data structure, determining a second type of data structure based on the first and second sets of statistics data, applying the modifications stored in the second data structure to the set of geometries stored in the first data structure to form a modified set of geometries, generating the third data structure having the second type, the third data structure configured to store the modified set of geometries, and storing the modified set of geometries in the third data structure.

In some embodiments, determining the second type of data structure based on the first and second sets of statistics data may include identifying a subset of a plurality of types of data structures based on the first and second sets of statistics data, determining cost values for each type of data structure in the subset of the plurality of types of data structures based on the first and second sets of statistics data, and determining a type of data structure from the subset of the plurality of types of data structures as the second type of data structure based on the determined cost values. The cost values for each type of data structure in the subset of the plurality of types of data structures may include a storage cost value and a set of query performance cost values. Determining the type of data structure from the subset of the plurality of types of data structures as the second type of data structure based on the determined cost values may include applying a defined weigh value to each query performance cost value in the set of query performance cost values.

In some embodiments, the modifications to the set of geometries comprises an addition of a geometry to the set of geometries. The modifications to the set of geometries may include a removal of a geometry from the set of geometries. The first data structure may be immutable.

In some embodiments, a system includes a set of processing units and a non-transitory machine-readable medium that stores instructions. The instructions cause at least one processing unit to identify a first data structure having a first type. The first data structure is configured to store a set of geometries. The instructions further cause the at least one processing unit to identify a second data structure associated with the first data structure. The second data structure is configured to store modifications to the set of geometries. The instructions also cause the at least one processing unit to perform a merge operation on the first data structure and the second data structure to form a third data structure by determining a first set of statistics data associated with the modifications to the set of geometries stored in the second data structure, retrieving a second set of statistics data associated with the set of geometries stored in the first data structure, determining a second type of data structure based on the first and second sets of statistics data, applying the modifications stored in the second data structure to the set of geometries stored in the first data structure to form a modified set of geometries, generating the third data structure having the second type, the third data structure configured to store the modified set of geometries, and storing the modified set of geometries in the third data structure.

In some embodiments, determining the second type of data structure based on the first and second sets of statistics data may include identifying a subset of a plurality of types of data structures based on the first and second sets of statistics data, determining cost values for each type of data structure in the subset of the plurality of types of data structures based on the first and second sets of statistics data, and determining a type of data structure from the subset of the plurality of types of data structures as the second type of data structure based on the determined cost values. In some embodiments, the cost values for each type of data structure in the subset of the plurality of types of data structures may include a storage cost value and a set of query performance cost values. Determining the type of data structure from the subset of the plurality of types of data structures as the second type of data structure based on the determined cost values may include applying a defined weigh value to each query performance cost value in the set of query performance cost values.

In some embodiments, the modifications to the set of geometries may include an addition of a geometry to the set of geometries. The modifications to the set of geometries may include a removal of a geometry from the set of geometries.

The following detailed description and accompanying drawings provide a better understanding of the nature and advantages of the present invention.

BRIEF DESCRIPTION OF THE DRAWINGS

FIG. 6 illustrates an example table of data structure type definitions according to some embodiments.

DETAILED DESCRIPTION

Figure 1:
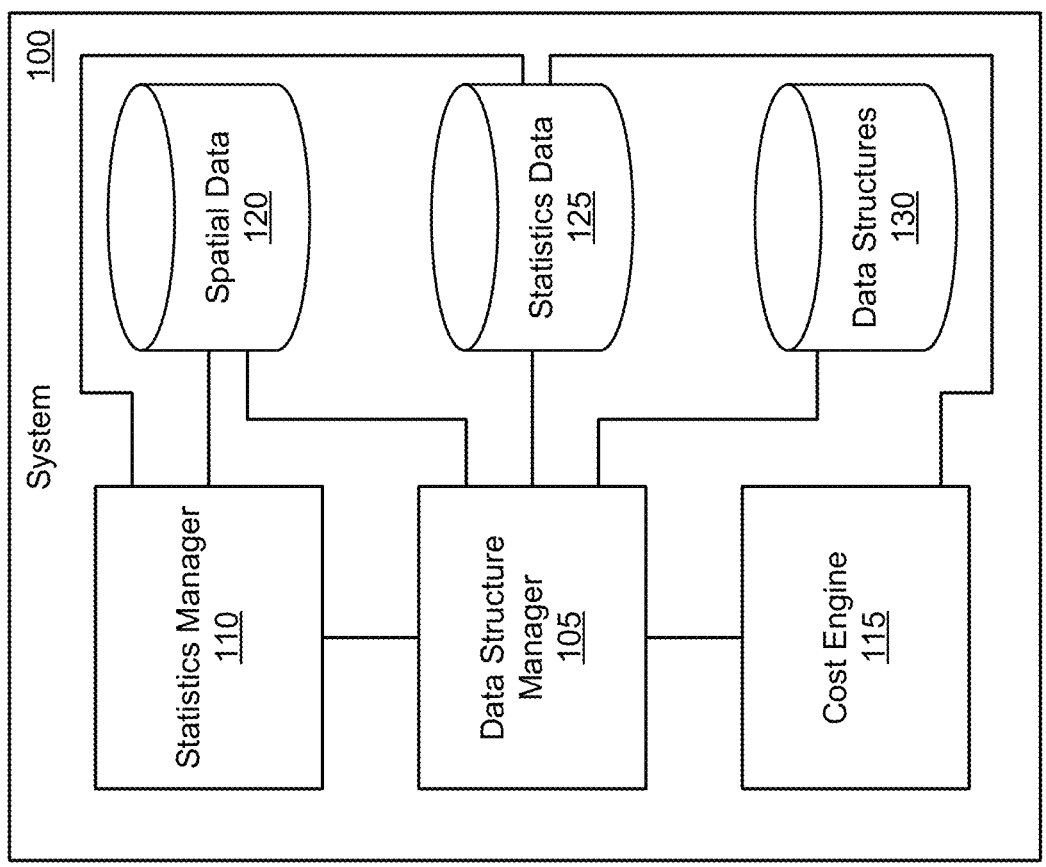
FIG. 1 illustrates a system for determining data structures according to some embodiments.

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Described herein are techniques for determining data structures for storing spatial data. In some embodiments, a system may merge two data structures storing spatial data into a single data structure for storing spatial data. For example, a first data structure may include spatial data while a second data structure may include modifications to the spatial data of the stored in the first data structure. When merging the two data structures into a single data structure, the system can determine a type of data structure to use for the single data structure. The system may generate statistics data associated with the spatial data stored in the two data structures.

Based on the statistics data, the system determines type of data structure to use for the single data structure. For instance, the system can identify several types of data structures from all the available types of data structures based on the statistics data. The system can then utilize the statistics data to calculate costs associated with each of the several identified types of data structures. Based on these calculated costs, the system selects a type of data structure to use for the single data structured into which the two data structures are merged. Next, the system generates an instance of the selected type of data structure and merges the spatial data from the two data structures into the generated data structure.

The techniques described in the present application provide a number of benefits and advantages over conventional methodologies for storing spatial data. First, by using statistics data associated with spatial data stored in data structures that are to be merged, the system is able to select a data structure into which the data structures are to be merged that uses an optimal amount of storage space (e.g., uses a reduced amount of storage space). Second, by using statistics data associated with spatial data stored in data structures that are to be merged, the system can select a data structure into which the spatial data of the data structures are to be merged that is optimized for querying the spatial data (e.g., faster querying of the spatial data).

In some embodiments, spatial data is data that defines the shape, size, position, and/or orientation of a geometry (e.g., a point, a line, a polygon, or any combination thereof) represents objects, elements, and/or entities in a defined space (e.g., roads, buildings, houses, cities, states, countries, lakes, mountains, landmarks, streets, etc. on or near the surface of the Earth). Objects, elements, and/or entities in a defined space may be referred to as spatial objects, elements, and/or entities. Spatial data can be represented using a spatial data type. An example of a spatial data type is an ST_Geometry data type defined by an Open Geospatial Consortium (OGC) standard. In some embodiments, a spatial data type can have a hierarchy of subtypes. Referring to an ST_Geometry data type as an example, the ST_Geometry can have an ST_Point subtype for representing points, an ST_LineString subtype for representing lines, an ST_Polygon subtype for representing polygons, an ST_CircularString subtype for representing circular strings, and an ST_GeometryCollection subtype for representing collections of geometries. The ST_GeometryCollection can have an ST_MultiPoint subtype for representing collections of points, an ST_MultiLineString subtype for representing collections of lines, and an ST_MultiPolygon subtype for representing collections of polygons.

A spatial data type can have an associated mode. In some embodiments, a mode of a spatial data type specifies a set of data fields used to describe the geometry of spatial data. For example, an XY mode specifies to use an x-coordinate (e.g., a longitude coordinate) and a y-coordinate (e.g., a latitude coordinate) to describe points in the geometry of spatial data stored according to the XY spatial data type mode. An XYZ mode may specify to use an x-coordinate (e.g., a longitude coordinate), a y-coordinate (e.g., a latitude coordinate), and a z-coordinate (e.g., a height coordinate or an altitude coordinate) to describe points in the geometry of spatial data stored according to the XYZ spatial data type mode. An XYM mode can specify to use an x-coordinate (e.g., a longitude coordinate), a y-coordinate (e.g., a latitude coordinate), and a measure to describe points in the geometry of spatial data stored according to the XYM spatial data type mode. An XYZM mode may specify to use an x-coordinate (e.g., a longitude coordinate), a y-coordinate (e.g., a latitude coordinate), a z-coordinate (e.g., a height coordinate or an altitude coordinate), and a measure to describe points in the geometry of spatial data stored according to the XYZM spatial data type mode. In some embodiments, a measure stores any number of different information that does not have a geometric meaning (e.g., the information is not used to describe the location of a point of a geometry like an x-coordinate, a y-coordinate, or a z-coordinate). For example, a measure can store a unique identifier associated with the point of a geometry, an average temperature at the point of the geometry, a time zone associated with the point of the geometry, etc. Further, in some embodiments, spatial data represented using a spatial data type can have geometries with empty values (e.g., an empty point, an empty linestring, an empty polygon, etc.). Spatial data represented using a spatial data type may have geometries with NULL values (e.g., Structured Query Language (SQL) NULL values).

FIG. 1 illustrates a system 100 for determining data structures according to some embodiments. In some embodiments, system 100 includes an in-memory database management system (DBMS) (not shown). In some such embodiments, the in-memory DBMS manages and stores spatial data and data structures configured to store spatial data in column-oriented databases, row-oriented databases, or a combination thereof.

As shown, system 100 includes data structure manager 105, statistics manager 110, cost engine 115, and storages 120-130. Spatial data storage 120 is configured to store spatial data (e.g., geometry data). In some embodiments, spatial data stored in spatial data storage 120 is stored in a well-known-text (WKT) format. Statistics data storage 125 stores statistics data associated with spatial data stored in data structures. Data structures storage 130 is configured to store data structures configured to store spatial data. In some embodiments, the spatial data stored in such data structures are stored as a spatial data type (e.g., an OGC spatial data type). Data structures storage 130 also stores definitions of different types of data structures for storing spatial data. In some embodiments, storages 120-130 are implemented in a single physical storage while, in other embodiments, storage 120-130 may be implemented across several physical storages. While FIG. 1 shows storages 120-130 as part of system 100, one of ordinary skill in the art will appreciate that one or more storages 120-130 may be external to system 100 in some embodiments.

Data structure manager 105 is responsible for managing data structures for storing spatial data. For example, for a particular set of spatial data (e.g., a set of spatial data stored in spatial data storage 120), data structure manager 105 may determine a type of data structure for storing the set of spatial data. To determine a type of data structure for the set of spatial data, data structure manager 105 may send statistics manager 110 a request for statistics data associated with the set of spatial data. In some embodiments, data structure manager 105 receives the requested statistics data from statistics manager 110. In other embodiments, data structure manager 105 receives a notification indicating that the statistics data is available in statistics data storage 125. In response, data structure manager 105 retrieves the statistics data from statistics data storage 125. Once data structure manager 105 has the requested statistics data, data structure manager 105 accesses data structures storage 130 to retrieve all the available data structure type definitions. Data structure manager 105 then determines a set of candidate types of data structures from the available data structure type definitions based on the statistics data for the set of spatial data. Next, data structure manager 105 sends cost engine 115 the statistics data for the set of spatial data and a request to for cost values associated with the set of candidate types of data structures.

After receiving the cost values from cost engine 115, data structure manager 105 determines a type of data structure from the set of candidate types of data structures based on the cost values. In some embodiments, the cost values that data structure manager 105 receives from cost engine 115 include, for each type of data structure in the set of candidate types of data structures, a storage cost value and a set of query performance cost values. In some such embodiments, data structure manager 105 determines a type of data structure from the set of candidate types of data structures by applying, for each type of data structure in the set of candidate types of data structures, defined weights to the set of query performance cost values associated with the type of data structure and calculating, for each type of data structure in the set of candidate types of data structures, an overall cost value based on the storage cost value and the weighted set of query performance cost values. Data structure manager 105 may apply a defined conversion factor expressed in terms of milliseconds (ms)/bit to the storage cost value when calculating the overall cost value for a particular type of data structure. After calculating the overall costs values, data structure manager 105 selects the type of data structure in the set of candidate types of data structures having the lowest overall cost value as the determined type of data structure.

Finally, data structure manager 105 generates an instance of the determined type of data structure, stores the set of spatial data in the data structure, and stores the data structure in data structures storage 130. Spatial operations may then be performed on the set of spatial data via the data structure such as, for example, performing queries on the set of spatial data, adding spatial data to the set of spatial data, removing spatial data from the set of spatial data, etc.

In some embodiments, the instance of the determined type of data structure that data structure manager 105 generates is immutable after data structure manager 105 stores the set of spatial data in the data structure. That is, only read operations may be performed on the data structure such as querying for some or all of the set of spatial data stored in the data structure, for example. The immutable data structure can be referred to as a main container. When a modification to the set of spatial data is to be made to the set of spatial data stored in a main container, data structure manager 105 generates another data structure that is associated with the main container and is mutable. This other data structure can be referred to as a delta container. The delta container is configured to store modifications to the set of spatial data stored in the main container. Data structure manager 105 may merge a main container with its associated delta container into a new main container. Similar to the original main container, the new main container is also immutable. Thus, data structure manager 105 may generate a delta container associated with the new main container, which is mutable, when modifications are made to the set of spatial data stored in the new main container. In some embodiments, data structure manager 105 merges main containers with their respective delta containers at defined intervals (e.g., once per hour, once per twelve hours, once per day, etc.) Alternatively, or in conjunction with merging at defined intervals, data structure manager 105 can merge a main container with its associated delta container when the delta container reaches a threshold size or reaches a threshold number of modifications to the set of spatial data stored in the main container.

When data structure manager 105 merges a particular main container with its associated delta container into a new main container, data structure manager 105 determines a type of data structure for the new main container. Data structure manager 105 may determine a type of data structure from a variety of different types of data structures configured for storing spatial data. In some embodiments, a particular type of data structure can store one or more of 2D point geometries, 3D point geometries, empty point values, NULL point values, 2D line geometries, 3D line geometries, 2D polygon geometries, and 3D polygon geometries. Examples of such types of data structures include a type of data structure that can store 2D point geometries (e.g., a 2D point container); a type of data structure can store 3D point geometries; a type of data structure can store 2D point geometries and 3D point geometries (e.g., a space fulling curve data structure); a type of data structure that can store 2D point geometries and 2D line geometries; a type of data structure that can store 3D point geometries and 3D line geometries; a type of data structure that can store 2D point geometries, 2D line geometries, 3D point geometries, and 3D line geometries; a type of data structure that can store 2D point geometries, 2D line geometries, and 2D polygon geometries; a type of data structure that can store 3D point geometries, 3D line geometries, and 3D polygon geometries; and a type of data structure that can store 2D point geometries, 2D line geometries, 2D polygon geometries, 3D point geometries, 3D line geometries, and 3D polygon geometries.

Further, different types of data structures can be optimized for different performance aspects. For example, one type of data structure that can store any type of geometries may be optimized for faster querying of spatial data stored in the data structure (e.g., an R-tree data structure) while another type of data structure that can also store any type of geometries may be optimized for faster writing of spatial data to the data structure. Yet another type of data structure that can also store any type of geometries may be optimized to use less storage space to store spatial data in the data structure. Similar types of data structures are possible for types of data structures that can store 2D point geometries, 3D point geometries, 2D line geometries, 3D line geometries, 2D polygon geometries, 3D polygon geometries, or any combination thereof.

In addition, different types of data structures can store geometries using different spatial data type modes. For example, one type of data structure can store 2D point geometries in XY mode while another type of data structure can store 2D point geometries in XYM mode. As another example, one type of data structure can store 3D point geometries in XYZ mode while another type of data structure can store 3D point geometries in XYZM mode. Similar types of data structures are possible for types of data structures that can store 2D point geometries, 3D point geometries, 2D line geometries, 3D line geometries, 2D polygon geometries, 3D polygon geometries, or any combination thereof.

To determine a type of data structure for a new main container into which a main container and its associated delta container are to be merged, data structure manager 105 sends statistics manager 110 a request for statistics data associated with the spatial data stored in the main container and the spatial data in the delta container. Upon receiving the requested statistics data, data structure manager 105 accesses data structures storage 130 to retrieve all the available data structure type definitions. Then, data structure manager 105 determines a set of candidate types of data structures from the available data structure type definitions based on the statistics data associated with the spatial data stored in the main container and the spatial data in the delta container. Then, data structure manager 105 sends cost engine 115 the statistics data associated with the spatial data stored in the main container and the spatial data in the delta container along with a request to determine cost values for the set of candidate types of data structures.

After receiving the cost values from cost engine 115, data structure manager 105 determines a type of data structure from the set of candidate types of data structures based on the cost values. In some embodiments, the cost values that data structure manager 105 receives from cost engine 115 include, for each type of data structure in the set of candidate types of data structures, a storage cost value and a set of query performance cost values. In some such embodiments, data structure manager 105 determines a type of data structure from the set of candidate types of data structures by applying, for each type of data structure in the set of candidate types of data structures, defined weights to the set of query performance cost values associated with the type of data structure and calculating, for each type of data structure in the set of candidate types of data structures, an overall cost value based on the storage cost value and the weighted set of query performance cost values. Data structure manager 105 may apply a defined conversion factor expressed in terms of milliseconds (ms)/bit to the storage cost value when calculating the overall cost value for a particular type of data structure. After calculating the overall costs values, data structure manager 105 selects the type of data structure in the set of candidate types of data structures having the lowest overall cost value as the determined type of data structure.

Next, data structure manager 105 generates an instance of the determined type of data structure as the new main container, applies the modifications specified in the delta container to the set of spatial data in the main container, stores the modified set of spatial data in the new main container, and stores the new main container in data structures storage 130. Spatial operations may then be performed on the modified set of spatial data via the new main container such as, for example, performing queries on the set of spatial data, adding spatial data to the set of spatial data, removing spatial data from the set of spatial data, etc.

Statistics manager 110 is configured to generate statistics data for sets of spatial data. For instance, statistics manager 110 may receive from data structure manager 105 a request for statistics data associated with a set of spatial data. In response, statistics manager 110 retrieves the set of spatial data from spatial data storage 120 and generates statistics data associated with the set of spatial data. Statistics data associated with a set of spatial data can include the number of NULL values in the spatial data, the number of empty values in the spatial data, the number of different spatial data type modes used in the spatial data, the distribution of the different spatial data type modes used in the spatial data, the total number of values for each of the different data types and/or subtypes (e.g., an ST_Geometry data type, an ST_Point data type, an ST_LineString data type, an ST_Polygon data type, etc.) used in the spatial data, the total number of distinct values for each of the different data types and/or subtypes used in the spatial data, etc., or any combination thereof. After generating the statistics data, statistics manager 110 stores the statistics data in statistics data storage 125. In some embodiments, statistics manager 110 also sends the statistics data to data structure manager 105. In other embodiments, statistics manager 110 sends data structure manager 105 a notification indicating that the statistics data are available in statistics data storage 125.

In some cases, statistics manager 110 can receive from data structure manager 105 a request for statistics data associated with spatial data stored in a main container and spatial data in a delta container associated with the main container. In response to such a request, statistics manager 110 retrieves from statistics data storage 125 statistics data associated with spatial data stored in the main container and retrieves from data structures storage 130 the delta container associated with the main container. Next, statistics manager 110 determines statistics data associated with spatial data stored in the main container and spatial data in the delta container based on the statistics data associated with the main container and the modification data stored in the delta container. In some embodiments, statistics manager 110 determines statistics data associated with spatial data stored in the main container and spatial data in the delta container by applying the modifications specified in the delta container to the spatial data stored in the main container and generating statistics data on the modified spatial data. Statistics data associated with the modified spatial data can include the number of NULL values in the modified spatial data, the number of empty values in the modified spatial data, the number of different spatial data type modes used in the modified spatial data, the distribution of the different spatial data type modes used in the modified spatial data, the total number of values for each of the different data types and/or subtypes (e.g., an ST_Geometry data type, an ST_Point data type, an ST_LineString data type, an ST_Polygon data type, etc.) used in the modified spatial data, the total number of distinct values for each of the different data types and/or subtypes used in the modified spatial data, etc., or any combination thereof. Once the statistics manager 110 generates the statistics data, statistics manager 110 stores them in statistics data storage 125. In some embodiments, statistics manager 110 also sends the statistics data to data structure manager 105. In other embodiments, statistics manager 110 sends data structure manager 105 a notification indicating that the statistics data are available in statistics data storage 125.

Cost engine 115 handles the determination of cost values for different types of data structures. For instance, cost engine 115 may receive from data structure manager 105 statistics data associated with a set of spatial data and a request for cost values associated with a set of types of data structures. In response, cost engine 115 determines, for each type of data structure in the set of types of data structures, a storage cost value and a set of query performance cost values. In some embodiments, cost engine 115 determines a storage cost value for a particular type of data structure by calculating, based on the statistics data associated with the set of spatial data, an amount of space consumed by a data structure of the particular type when data structure stores the set of spatial data.

To determine a set of query performance cost values for a particular type of data structure, cost engine 115 calculates a query performance cost value for each query in a defined set of queries that represents an amount of time it takes to perform the query on a data structure of the particular type that stores the set of spatial data. In some embodiments, cost engine 115 calculates a query performance cost value for a query performed on a data structure of a particular type that stores the set of spatial data using a cost model developed by S. Manegold, P. Boncz, and M. L. Kersten in "Generic Database cost models for hierarchical memory systems," in Proceedings of the 28th international conference on very large data bases, pp. 191-202, VLDB Endowment, 2002. After calculating a storage cost value and a set of query performance cost values for each type of data structure in the set of types of data structures, cost engine 115 sends the cost values to data structure manager 105.

An example operation of system 100 will now be described by reference to FIGS. 1-6. Specifically, the operation involves determining a set of candidate types of data structures from the available data structure type definitions, which is part of the process of merging a main container with its associated delta container into a new main container. The main container and the delta container that will be merged in this example are illustrated in FIGS. 2-5.

Figure 2:
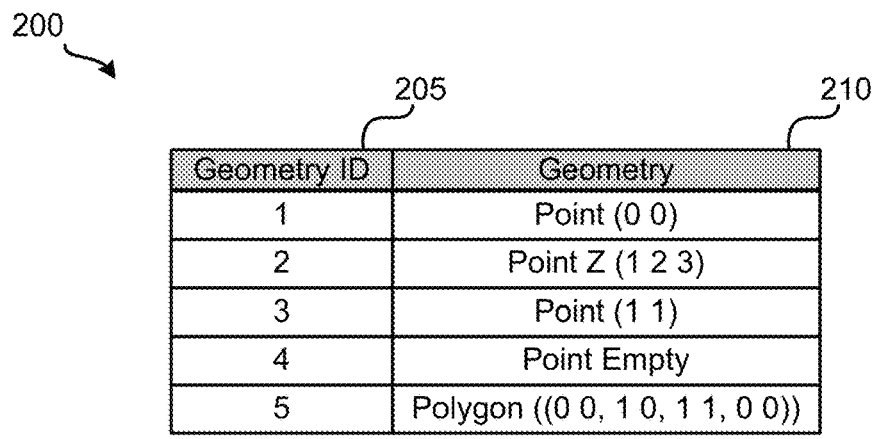
FIG. 2 illustrates an example table of geometries according to some embodiments.
Figure 3:
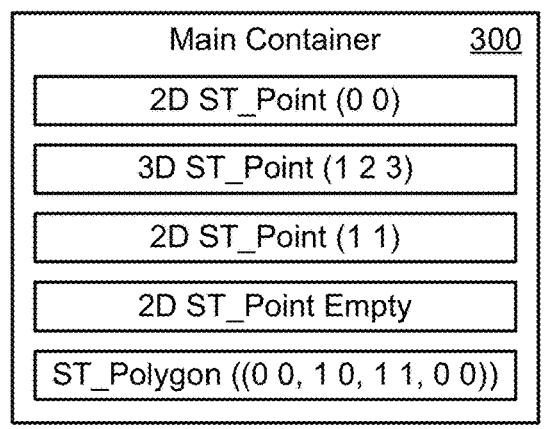
FIG. 3 illustrates an example main container data structure according to some embodiments.

FIG. 2 illustrates an example table 200 of geometries according to some embodiments. For this example, table 200 is stored in spatial data storage 120. As shown, table 200 includes columns 205 and 210. Column 205 is configured to store a geometry ID and column 210 is configured to store a corresponding a geometry in WTK format. As illustrated, table 200 includes five geometries: a 2D point with coordinates (0 0), a 3D point with coordinates (1 2 3), a 2D point with coordinates (1 1), an empty point, and a polygon with coordinates (0 0, 1 0, 1 1, 0 0). FIG. 3 illustrates an example main container data structure 300 according to some embodiments. For this example, data structure manager 105 generated main container data structure 300 and stored the geometries in table 200 in main container data structure 300 as an ST_Geometry spatial data type. As shown, main container data structure 300 stores the 2D point with coordinates (0 0) as an ST_Point spatial data subtype, the 3D point with coordinates (1 2 3) as an ST_Point spatial data subtype, the 2D point with coordinates (1 1) as an ST_Point spatial data subtype, the empty point as an ST_Point spatial data subtype, and the polygon with coordinates (0 0, 1 0, 1 1, 0 0) as an ST_Polygon spatial data subtype.

Figures 4, 5:
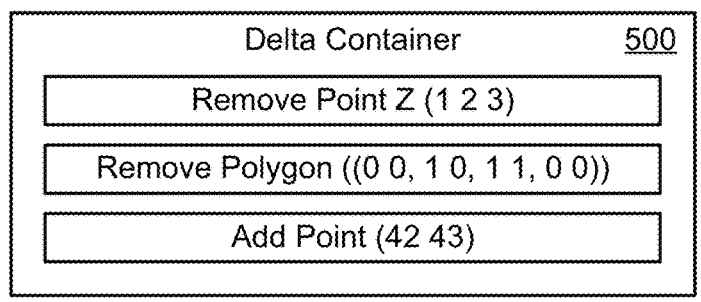
FIG. 4 illustrates modifications to the table of geometries illustrated in FIG. 2 according to some embodiments.
FIG. 5 illustrates an example delta container data structure associated with the main container data structure illustrated in FIG. 3 according to some embodiments.

FIG. 4 illustrates modifications to the table of geometries illustrated in FIG. 2 according to some embodiments. As shown, the second geometry and the fifth geometry in table 200 have been removed, as indicated by a dash. In addition, a 2D point with coordinates (42 43) has been added to table 200. FIG. 5 illustrates an example delta container data structure 500 associated with the main container data structure illustrated in FIG. 3 according to some embodiments. In particular, delta container data structure 500 includes the modifications made to table 200 as illustrated in FIG. 4. As shown, delta container structure 500 includes information specifying to remove the second and fifth entries from table 200 and to add a new point to the table 200.

The example operation starts when data structure manager 105 begins the process for merging main container data structure 300 with its associated delta container data structure 500 into a new main container. First, data structure manager 105 sends statistics manager 110 a request for statistics data associated with the spatial data stored in the main container and the spatial data in the delta container. In response to the request, statistics manager 110 retrieves from statistics data storage 125 statistics data associated with spatial data stored in main container data structure 300 and retrieves from data structures storage 130 the delta container data structure 500.

Next, statistics manager 110 determines statistics data associated with spatial data stored in main container data structure 300 and spatial data in delta container data structure 500 based on the statistics data associated with main container data structure 300 and the modification data stored in delta container data structure 500. For this example, statistics manager 110 determines statistics data associated with spatial data stored in the main container and spatial data in the delta container by applying the modifications specified in delta container data structure 500 to the spatial data stored in main container data structure 300 and generating statistics data on the modified spatial data. In this example, statistics data associated with the modified spatial data includes the number of NULL values in the modified spatial data (zero in this example), the number of empty values in the modified spatial data (one in this example), the number of different spatial data type modes used in the modified spatial data (one in this example: XY mode), the distribution of the different spatial data type modes used in the modified spatial data (three in this example), the total number of values for each of the different data types and/or subtypes used in the modified spatial data (four total values for the 2D ST_Point subtype in this example), and the total number of distinct values for each of the different data types and/or subtypes used in the modified spatial data (four distinct values for the ST_Point subtype in this example). Upon generating the statistics data, statistics manager 110 stores them in statistics data storage 125 and then sends the statistics data to data structure manager 105.

When data structure manager 105 receives the statistics data, data structure manager 105, data structure manager 105 accesses data structures storage 130 to retrieve all the available data structure type definitions. The available data structure type definitions for this example are shown in FIG. 6. FIG. 6 illustrates an example table 600 of data structure type definitions according to some embodiments. As shown, table 600 includes columns 605-625. Column 605 stores a data structure name, column 610 stores a value (e.g., Yes or No) indicating whether a data structure supports 2D point geometries, column 615 stores a value (e.g., Yes or No) indicating whether a data structure supports 3D point geometries, column 620 stores a value (e.g., Yes or No) indicating whether a data structure supports empty point values, and column 625 stores a value (e.g., Yes or No) indicating whether a data structure supports polygon geometries.

After data structure manager 105 retrieves the data structure type definitions illustrated in table 600 from data structures storage 130, data structure manager 105 determines a set of candidate types of data structures from data structure type definitions based on the statistics data associated with the spatial data stored in the main container and the spatial data in the delta container. Specifically, data structure manager 105 determines, based on the statistics data associated with the spatial data stored in the main container and the spatial data in the delta container, each data structure in the set of candidate types of data structure needs to support 2D point geometries and empty point values. In this example, data structure manager 105 includes the types of data structures that support only 2D point geometries and empty point values in the set of candidate types of data structures, which are the 2D Point Container, single dictionary (SD) data structure type and the 2D Point Container, double dictionary (DD) data structure type.

Another example operation of system 100 will now be described. In particular, this operation involves determining a type of data structure for a new main container into which a main container with its associated delta container is merged. For this example, the set of candidate types of data structures that data structure manager 105 has determined includes the 2D Point Container SD data structure type and the 2D Point Container DD data structure type illustrated in table 600. The set of spatial data to be stored in the new main container in this example includes 300 2D point geometries with 230 distinct x-coordinate values, 250 distinct y-coordinate values, and 450 distinct coordinate values (i.e., the union of the 230 distinct x-coordinate values and the 250 distinct y-coordinate values).

The operation begins when cost engine 115 receives from data structure manager 105 statistics data associated with the set of spatial data and a request for cost values associated with a set of types of data structures. In response, cost engine 115 determines, for each type of data structure in the set of types of data structures, a storage cost value and a set of query performance cost values. In this example, the 2D Point Container SD data structure type is implemented as a single dictionary that maps value identifiers (IDs) to each of the distinct coordinate values (i.e., the union of distinct x-coordinate values and distinct y-coordinate values) and two vectors: a first vector that stores value IDs of the single dictionary that correspond to x-coordinates of the points in the set of spatial data and a second vector that stores value IDs of the single dictionary that correspond to y-coordinates of the points in the set of spatial data. The 2D Point Container DD data structure type, in this example, is implemented as two dictionaries and two vectors. A first dictionary maps value IDs to each of the distinct x-coordinate values in the set of spatial data and a second dictionary maps value IDs to each of the distinct y-coordinate values. A first vector stores value IDs of the first dictionary that correspond to x-coordinates of the points in the set of spatial data and a second vector stores value IDs of the second dictionary that correspond to y-coordinates of the points in the set of spatial data.

Cost engine 115 uses the following equation (1) to determine the storage requirement for the single dictionary of the 2D Point Container SD data structure type:

$$D_{xy} = Mem_w \times S_{xy}$$

where $D_{xy}$ is the size of the dictionary in terms of bits, $Mem_w$ is the width of the memory address in bits, and $S_{xy}$ is the number of distinct coordinate values in the set of spatial data. Cost engine 115 uses the following equation (2) to determine the storage requirement for each of the first and second vectors of the 2D Point Container SD data structure type:

$$I_{xy} = \lceil \log_2(S_{xy}+2) \rceil \times S$$

where $I_{xy}$ is the size of the vector in terms of bits and S is the number of 2D point geometries in the set of spatial data. Note the "+2" in the log function accounts for the NULL value and the empty point value. Cost engine 115 uses the following equation (3) to determine the total storage requirement for the 2D Point Container SD data structure type:

$$Storage_s = D_{xy} + 2 \times I_{xy}$$

where $Storage_s$ is the totals size of the 2D Point Container SD data structure type in terms of bits. For this example, cost engine 115 determines the totals size of the 2D Point Container SD data structure type to be the following:

$$33600 \text{ bits} = 64 \times 450 + 2 \times \lceil \log_2(450+2) \rceil \times 300$$

For the 2D Point Container DD data structure type, cost engine 115 uses the following equation (4) to determine the storage requirement for the first dictionary of the 2D Point Container DD data structure type:

$$D_x = Mem_w \times S_x$$

where $D_x$ is the size of the first dictionary in terms of bits, $Mem_w$ is the width of the memory address in bits, and $S_x$ is the number of distinct x-coordinate values in the set of spatial data. Cost engine 115 uses the following equation (5) to determine the storage requirement for the second dictionary of the 2D Point Container DD data structure type:

$$D_y = Mem_w \times S_y$$

where $D_y$ is the size of the second dictionary in terms of bits, $Mem_w$ is the width of the memory address in bits, and $S_y$ is the number of distinct y-coordinate values in the set of spatial data. Cost engine 115 uses the following equation (6) to determine the storage requirement for the first vector of the 2D Point Container DD data structure type:

$$I_x = \lceil \log_2(S_x+2) \rceil \times S$$

where $I_x$ is the size of the first vector in terms of bits, $S_x$ is the number of distinct x-coordinate values in the set of spatial data, and S is the number of 2D point geometries in the set of spatial data. Cost engine 115 uses the following equation (7) to determine the storage requirement for the second vector of the 2D Point Container DD data structure type:

$$I_y = \lceil \log_2(S_y+2) \rceil \times S$$

where $I_y$ is the size of the second vector in terms of bits, and $S_y$ is the number of distinct y-coordinate values in the set of spatial data, and S is the number of 2D point geometries in the set of spatial data. Cost engine 115 uses the following equation (8) to determine the total storage requirement for the 2D Point Container DD data structure type:

$$Storage_d = D_x + D_x + I_x + I_y$$

where $Storage_d$ is the totals size of the 2D Point Container DD data structure type in terms of bits. In this example, cost engine 115 determines the totals size of the 2D Point Container DD data structure type to be the following:

$$35520 \text{ bits} = 64 \times 230 + 64 \times 250 + \lceil \log_2(230+2) \rceil \times 300 + \lceil \log_2(250+2) \rceil \times 300$$

As mentioned above, cost engine 115 may determine a set of query performance cost values for a particular type of data structure by calculating a query performance cost value for each query in a defined set of queries that represents an amount of time it takes to perform the query on a data structure of the particular type that stores the set of spatial data. In this example, the defined set of queries includes a first query that selects all the available points in the set of spatial data and a second query that selects a subset of points in the set of spatial data based on a bounding-box query.

Cost engine 115 uses the following equation (9) to determine the query performance cost value storage for the first query on a data structure of the 2D Point Container SD data structure type:

$$QueryPerf_{q1,SD} = s\_tra(I_{xyx}) \odot s\_tra(I_{xyy}) \odot r\_acc(2 \times S, D_{xy}) \odot s\_tra(Out)$$

where $QueryPerf_{q1,SD}$ is the amount of time it takes to perform the first query on a data structure of the 2D Point Container SD data structure type in terms of milliseconds (ms), wherein s_tra and r_acc are functions described by S. Manegold, P. Boncz, and M. L. Kersten in "Generic Database cost models for hierarchical memory systems," in Proceedings of the 28th international conference on very large data bases, pp. 191-202, VLDB Endowment, 2002, $I_{xyx}$ is the memory region that stores the first vector of the 2D Point Container SD data structure type, $I_{xyy}$ is the memory region that stores the second vector of the 2D Point Container SD data structure type, $D_{xy}$ is the memory region that stores the single dictionary of the 2D Point Container SD data structure type, and Out is the memory region that stores the results of the first query. Cost engine 115 uses the following equation (10) to determine the query performance cost value storage for the second query on a data structure of the 2D Point Container SD data structure type:

$$QueryPerf_{q2,SD} = r\_acc(\log_2(D_{xy}), D_{xy}) \oplus$$
$$(s\_tra(I_{xyx}) \odot s\_tra(I_{xyy}) \odot r\_acc(2 \times S, D_{xy}) \odot s\_tra(Out))$$

where $QueryPerf_{q2,SD}$ is the amount of time it takes to perform the second query on a data structure of the 2D Point Container SD data structure type in terms of ms, $I_{xyx}$ is the memory region that stores the first vector of the 2D Point Container SD data structure type, $I_{xyy}$ is the memory region that stores the second vector of the 2D Point Container SD data structure type, $D_{xy}$ is the memory region that stores the single dictionary of the 2D Point Container SD data structure type, and Out is the memory region that stores the results of the second query. For this example, cost engine 115 determines the amount of time it takes to perform the first query on a data structure of the 2D Point Container SD data structure type to be 30 ms and the amount of time it takes to perform the second query on a data structure of the 2D Point Container SD data structure type to be 32 ms.

For the 2D Point Container DD data structure type, cost engine 115 uses the following equation (11) to determine the query performance cost value storage for the first query on a data structure of the 2D Point Container DD data structure type:

$$QueryPerf_{q1,DD} = s\_tra(I_x) \odot s\_tra(I_y) \odot r\_acc(S, D_x)$$
$$\odot r\_acc(S, D_y) \odot s\_tra(Out)$$

where $QueryPerf_{q1,DD}$ is the amount of time it takes to perform the first query on a data structure of the 2D Point Container DD data structure type in terms of ms, $I_x$ is the memory region that stores the first vector of the 2D Point Container DD data structure type, $I_y$ is the memory region that stores the second vector of the 2D Point Container DD data structure type, $D_x$ is the memory region that stores the first dictionary of the 2D Point Container DD data structure type, $D_y$ is the memory region that stores the second dictionary of the 2D Point Container DD data structure type, and Out is the memory region that stores the results of the first query. Cost engine 115 uses the following equation (12) to determine the query performance cost value storage for the second query on a data structure of the 2D Point Container SD data structure type:

$$QueryPerf_{q2,DD} = r\_acc(\log_2(D_x), D_x) \odot r\_acc(\log_2(D_y), D_y) \oplus$$
$$(s\_tra(I_x) \odot s\_tra(I_y) \odot r\_acc(S, D_x) \odot r\_acc(S, D_y) \odot s\_tra(Out))$$

where $QueryPerf_{q2,SD}$ is the amount of time it takes to perform the second query on a data structure of the 2D Point Container DD data structure type in terms of ms, $I_x$ is the memory region that stores the first vector of the 2D Point Container DD data structure type, $I_y$ is the memory region that stores the second vector of the 2D Point Container DD data structure type, $D_x$ is the memory region that stores the first dictionary of the 2D Point Container DD data structure type, $D_y$ is the memory region that stores the second dictionary of the 2D Point Container DD data structure type, and Out is the memory region that stores the results of the second query. In this example, cost engine 115 determines the amount of time it takes to perform the first query on a data structure of the 2D Point Container DD data structure type to be 25 ms and the amount of time it takes to perform the second query on a data structure of the 2D Point Container DD data structure type to be 27 ms. Cost engine 115 then sends the determined storage cost values and query performance cost values to data structure manager 105.

When data structure manager 105 receives the cost values for each of the 2D Point Container SD data structure type and 2D Point Container DD data structure type, data structure manager 105 calculates an overall cost value for each type of data structure using the following equation (13):

$$TotalCost_i = Storage_i \times C + WeightedQueryPerf_i$$

where $TotalCost_i$ is the overall cost value for the $i^{th}$ type of data structure, Storage, is the storage cost value of the $i^{th}$ type of data structure with a defined conversion factor applied to it, and $WeightQueryPerf_i$ is the sum of the weighted query performance values for the $i^{th}$ type of data structure. For this example, the conversion factor is $\frac{1}{10000}$ ms/bit, the weight for the first query is 0.5, and the weight for the second query is 1.0. Thus, data structure manager 105 calculates the overall cost value for the 2D Point Container SD data structure type as the following:

$$80.6 \text{ ms} = 33600 \times \tfrac{1}{10000} + (0.5 \times 30 + 1.0 \times 32)$$

Additionally, data structure manager 105 calculates the overall cost value for the 2D Point Container DD data structure type as the following:

$$75.02 \text{ ms} = 35520 \times \tfrac{1}{10000} + (0.5 \times 25 + 1.0 \times 27)$$

After calculating the overall costs values, data structure manager 105 selects the type of data structure having the lowest overall cost value as the determined type of data structure. In this example, data structure manager 105 determines the 2D Point Container DD data structure type as the type of data structure for the new main container.

The operations described above describe specific examples of determining a set of candidate types of data structures from the available data structure type definitions and determining a type of data structure for a new main container into which a main container with its associated delta container are merged. One of ordinary skill in the art will appreciate that the same or similar concepts explained in the example operations may be applied to different types of data structures, spatial data, and cost models.

Figure 7:
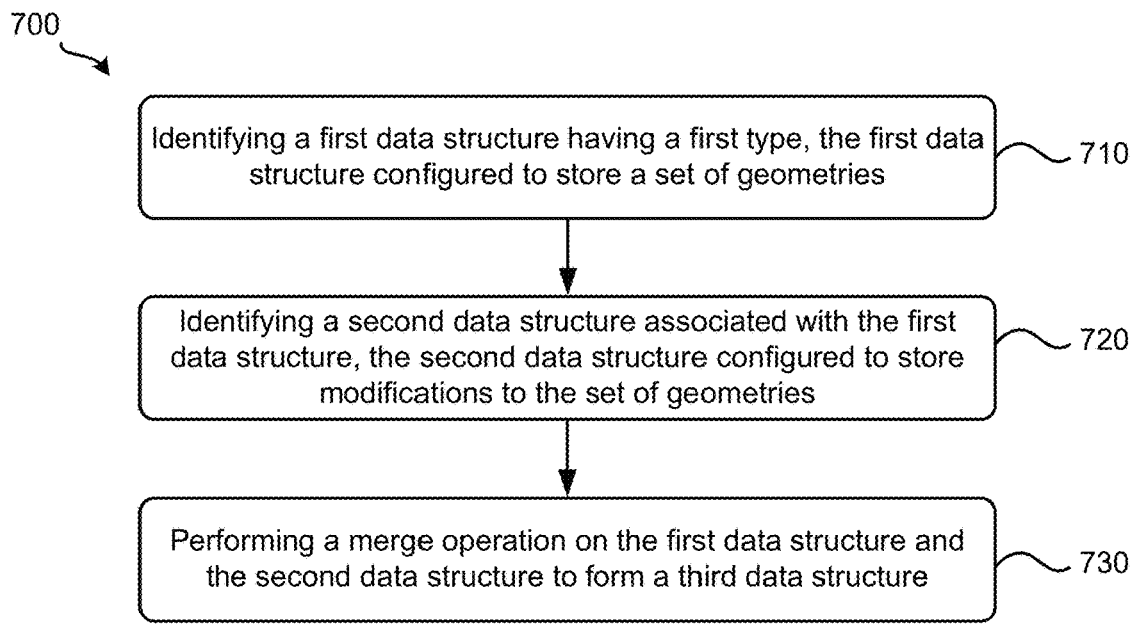
FIG. 7 illustrates a process for determining data structures according to some embodiments.

FIG. 7 illustrates a process 700 for determining data structures according to some embodiments. In some embodiments, system 100 performs process 700 to merge a main container and its associated delta container into a new main container. Process 700 starts by identifying, at 710, a first data structure having a first type, the first data structure configured to store a set of geometries. Referring to FIG. 1 as an example, data structure manager 105 may access data structures storage 130 to identify a main container (e.g., main container data structure 300) storing a set of spatial data for use in a merge operation.

Next, process 700 identifies, at 720, a second data structure associated with the first data structure. The second data structure may be configure to store modifications to the set of geometries. Referring to FIG. 1 as an example, data structure manager 105 may access data structures storage 130 to identify a delta container (e.g., delta container data structure 500) associated with the main container identified in operation 710 for use in the merge operation.

Finally, process 700 performs, at 730, a merge operation on the first data structure and the second data structure to form a third data structure. In some embodiments, process 700 performs operation 730 by performing process 800, explained in detail below by reference to FIG. 8. Referring to FIG. 1 as an example, data structure manager 105 can merge a main container and its associated delta container into a new main container.

Figure 8:
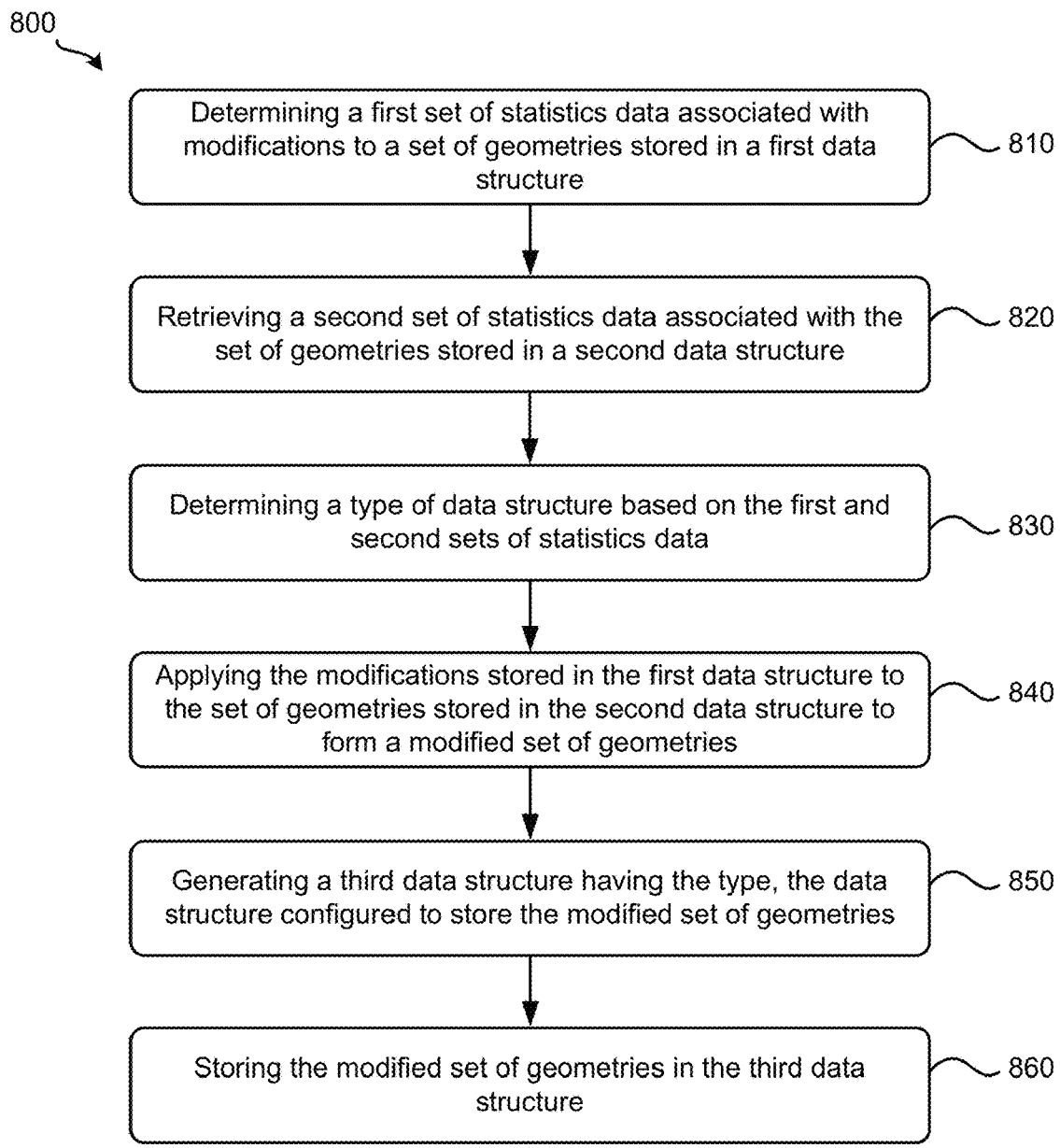
FIG. 8 illustrates a process for merging data structures according to some embodiments.

FIG. 8 illustrates a process 800 for merging data structures according to some embodiments. In some embodiments, process 700 performs process 800 as part of operation 730. Process 800 begins by determining, at 810, a first set of statistics data associated with modifications to a set of geometries stored in a first data structure. Referring to FIGS. 1, 2, and 5 as an example, statistics manager 110 can determine a first set of statistics data associated with modifications to table 200 stored in delta container data structure 500.

Next, process 800 retrieves, at 820, a second set of statistics data associated with the set of geometries stored in a second data structure. Referring to FIGS. 1 and 3 as an example, statistics manager 110 may retrieve from statistics data storage 125 a second set of statistics data associated with main container data structure 300. Process 800 then determines, at 830, a type of data structure based on the first and second sets of statistics data. Referring to FIGS. 1, 3, and 5 as an example, data structure manager 105 can determine a type of data structure for a new main container into which main container data structure 300 and its associated delta container data structure 500 are to be merged.

Next, process 800 applies, at 840, the modifications stored in the first data structure to the set of geometries stored in the second data structure to form a modified set of geometries. Referring to FIGS. 1, 3, 4, and 5 as an example, data structure manager 105 may apply the modifications specified in delta container data structure 500 to the set of geometries stored in main container data structure 300 to form the modified set of geometries illustrated in table 200 of FIG. 4.

Process 800 then generates, at 850, a data structure having the type. The data structure is configured to store the modified set of geometries. Referring to FIGS. 1, 3, and 5 as an example, data structure manager 105 may generate a data structure having the determine type for the new main container into which main container data structure 300 and its associated delta container data structure 500 are to be merged. Finally, process 800 stores, at 860, the modified set of geometries in the data structure. Referring to FIGS. 1 and 4 as an example, data structure manager 105 can store the modified set of geometries illustrated in table 200 of FIG. 4 into the new main container.

Figure 9:
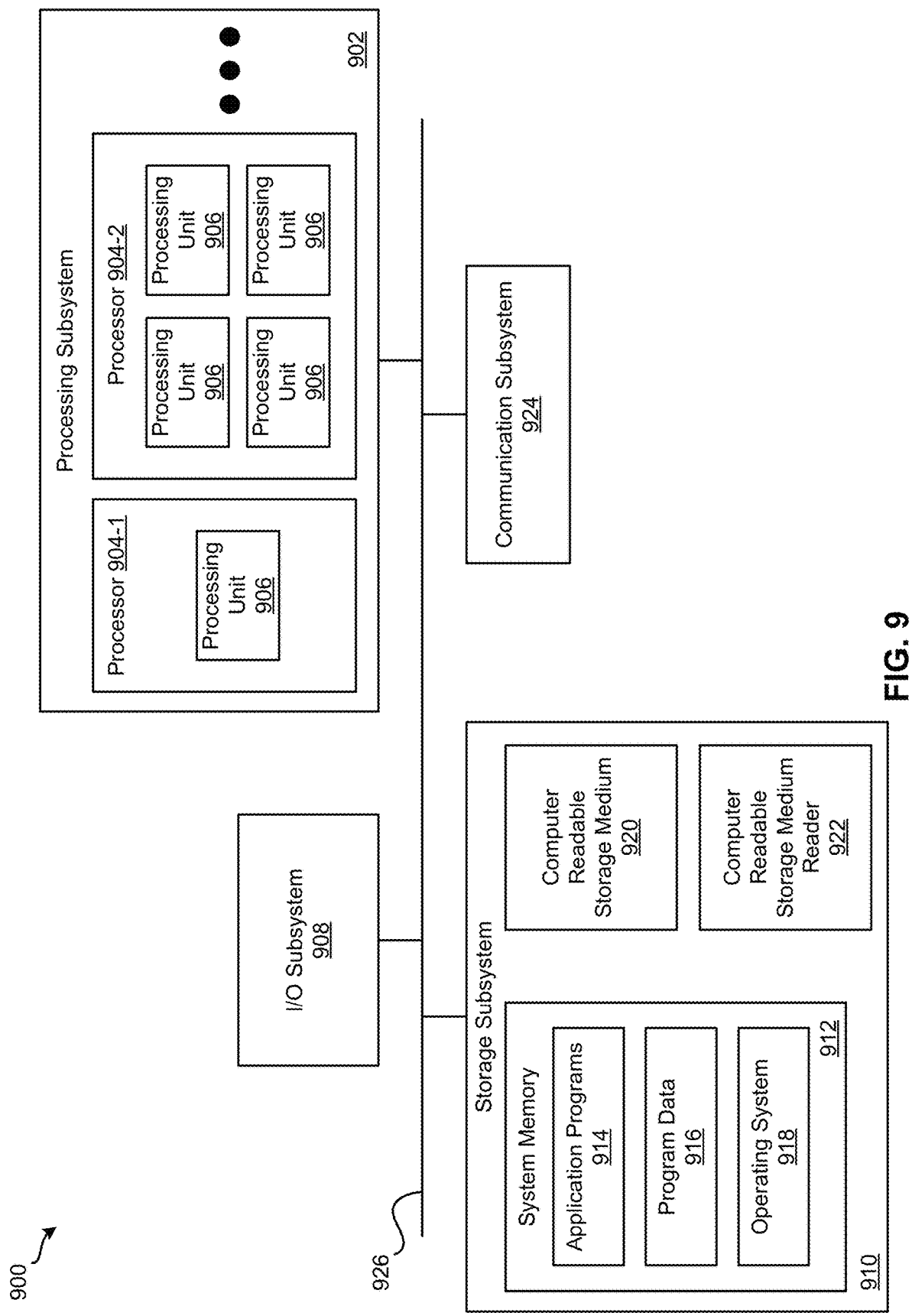
FIG. 9 illustrates an exemplary computer system, in which various embodiments may be implemented.

FIG. 9 illustrates an exemplary computer system 900 for implementing various embodiments described above. For example, computer system 900 may be used to implement system 90. Computer system 900 may be a desktop computer, a laptop, a server computer, or any other type of computer system or combination thereof. Some or all elements of data structure manager 105, statistics manager 110, cost engine 115, or combinations thereof can be included or implemented in computer system 900. In addition, computer system 900 can implement many of the operations, methods, and/or processes described above (e.g., process 700 and process 800). As shown in FIG. 9, computer system 900 includes processing subsystem 902, which communicates, via bus subsystem 926, with input/output (I/O) subsystem 908, storage subsystem 910 and communication subsystem 924.

Bus subsystem 926 is configured to facilitate communication among the various components and subsystems of computer system 900. While bus subsystem 926 is illustrated in FIG. 9 as a single bus, one of ordinary skill in the art will understand that bus subsystem 926 may be implemented as multiple buses. Bus subsystem 926 may be any of several types of bus structures (e.g., a memory bus or memory controller, a peripheral bus, a local bus, etc.) using any of a variety of bus architectures. Examples of bus architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnect (PCI) bus, a Universal Serial Bus (USB), etc.

Processing subsystem 902, which can be implemented as one or more integrated circuits (e.g., a conventional microprocessor or microcontroller), controls the operation of computer system 900. Processing subsystem 902 may include one or more processors 904. Each processor 904 may include one processing unit 906 (e.g., a single core processor such as processor 904-1) or several processing units 906 (e.g., a multicore processor such as processor 904-2). In some embodiments, processors 904 of processing subsystem 902 may be implemented as independent processors while, in other embodiments, processors 904 of processing subsystem 902 may be implemented as multiple processors integrate into a single chip or multiple chips. Still, in some embodiments, processors 904 of processing subsystem 902 may be implemented as a combination of independent processors and multiple processors integrated into a single chip or multiple chips.

In some embodiments, processing subsystem 902 can execute a variety of programs or processes in response to program code and can maintain multiple concurrently executing programs or processes. At any given time, some or all of the program code to be executed can reside in processing subsystem 902 and/or in storage subsystem 910. Through suitable programming, processing subsystem 902 can provide various functionalities, such as the functionalities described above by reference to process 700, process 800, etc.

I/O subsystem 908 may include any number of user interface input devices and/or user interface output devices. User interface input devices may include a keyboard, pointing devices (e.g., a mouse, a trackball, etc.), a touchpad, a touch screen incorporated into a display, a scroll wheel, a click wheel, a dial, a button, a switch, a keypad, audio input devices with voice recognition systems, microphones, image/video capture devices (e.g., webcams, image scanners, barcode readers, etc.), motion sensing devices, gesture recognition devices, eye gesture (e.g., blinking) recognition devices, biometric input devices, and/or any other types of input devices.

User interface output devices may include visual output devices (e.g., a display subsystem, indicator lights, etc.), audio output devices (e.g., speakers, headphones, etc.), etc. Examples of a display subsystem may include a cathode ray tube (CRT), a flat-panel device (e.g., a liquid crystal display (LCD), a plasma display, etc.), a projection device, a touch screen, and/or any other types of devices and mechanisms for outputting information from computer system 900 to a user or another device (e.g., a printer).

As illustrated in FIG. 9, storage subsystem 910 includes system memory 912, computer-readable storage medium 920, and computer-readable storage medium reader 922. System memory 912 may be configured to store software in the form of program instructions that are loadable and executable by processing subsystem 902 as well as data generated during the execution of program instructions. In some embodiments, system memory 912 may include volatile memory (e.g., random access memory (RAM)) and/or non-volatile memory (e.g., read-only memory (ROM), programmable read-only memory (PROM), erasable programmable read-only memory (EPROM), electrically erasable programmable read-only memory (EEPROM), flash memory, etc.). System memory 912 may include different types of memory, such as static random access memory (SRAM) and/or dynamic random access memory (DRAM). System memory 912 may include a basic input/output system (BIOS), in some embodiments, that is configured to store basic routines to facilitate transferring information between elements within computer system 900 (e.g., during start-up). Such a BIOS may be stored in ROM (e.g., a ROM chip), flash memory, or any other type of memory that may be configured to store the BIOS.

As shown in FIG. 9, system memory 912 includes application programs 914, program data 916, and operating system (OS) 918. OS 918 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Computer-readable storage medium 920 may be a non-transitory computer-readable medium configured to store software (e.g., programs, code modules, data constructs, instructions, etc.). Many of the components (e.g., data structure manager 105, statistics manager 110, and cost engine 15) and/or processes (e.g., process 700 and process 800) described above may be implemented as software that when executed by a processor or processing unit (e.g., a processor or processing unit of processing subsystem 902) performs the operations of such components and/or processes. Storage subsystem 910 may also store data used for, or generated during, the execution of the software.

Storage subsystem 910 may also include computer-readable storage medium reader 922 that is configured to communicate with computer-readable storage medium 920. Together and, optionally, in combination with system memory 912, computer-readable storage medium 920 may comprehensively represent remote, local, fixed, and/or removable storage devices plus storage media for temporarily and/or more permanently containing, storing, transmitting, and retrieving computer-readable information.

Computer-readable storage medium 920 may be any appropriate media known or used in the art, including storage media such as volatile, non-volatile, removable, non-removable media implemented in any method or technology for storage and/or transmission of information. Examples of such storage media includes RAM, ROM, EEPROM, flash memory or other memory technology, compact disc read-only memory (CD-ROM), digital versatile disk (DVD), Blu-ray Disc (BD), magnetic cassettes, magnetic tape, magnetic disk storage (e.g., hard disk drives), Zip drives, solid-state drives (SSD), flash memory card (e.g., secure digital (SD) cards, CompactFlash cards, etc.), USB flash drives, or any other type of computer-readable storage media or device.

Communication subsystem 924 serves as an interface for receiving data from, and transmitting data to, other devices, computer systems, and networks. For example, communication subsystem 924 may allow computer system 900 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication subsystem 924 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication subsystem 924 may provide components configured for wired communication (e.g., Ethernet) in addition to or instead of components configured for wireless communication.

One of ordinary skill in the art will realize that the architecture shown in FIG. 9 is only an example architecture of computer system 900, and that computer system 900 may have additional or fewer components than shown, or a different configuration of components. The various components shown in FIG. 9 may be implemented in hardware, software, firmware or any combination thereof, including one or more signal processing and/or application specific integrated circuits.

Figure 10:
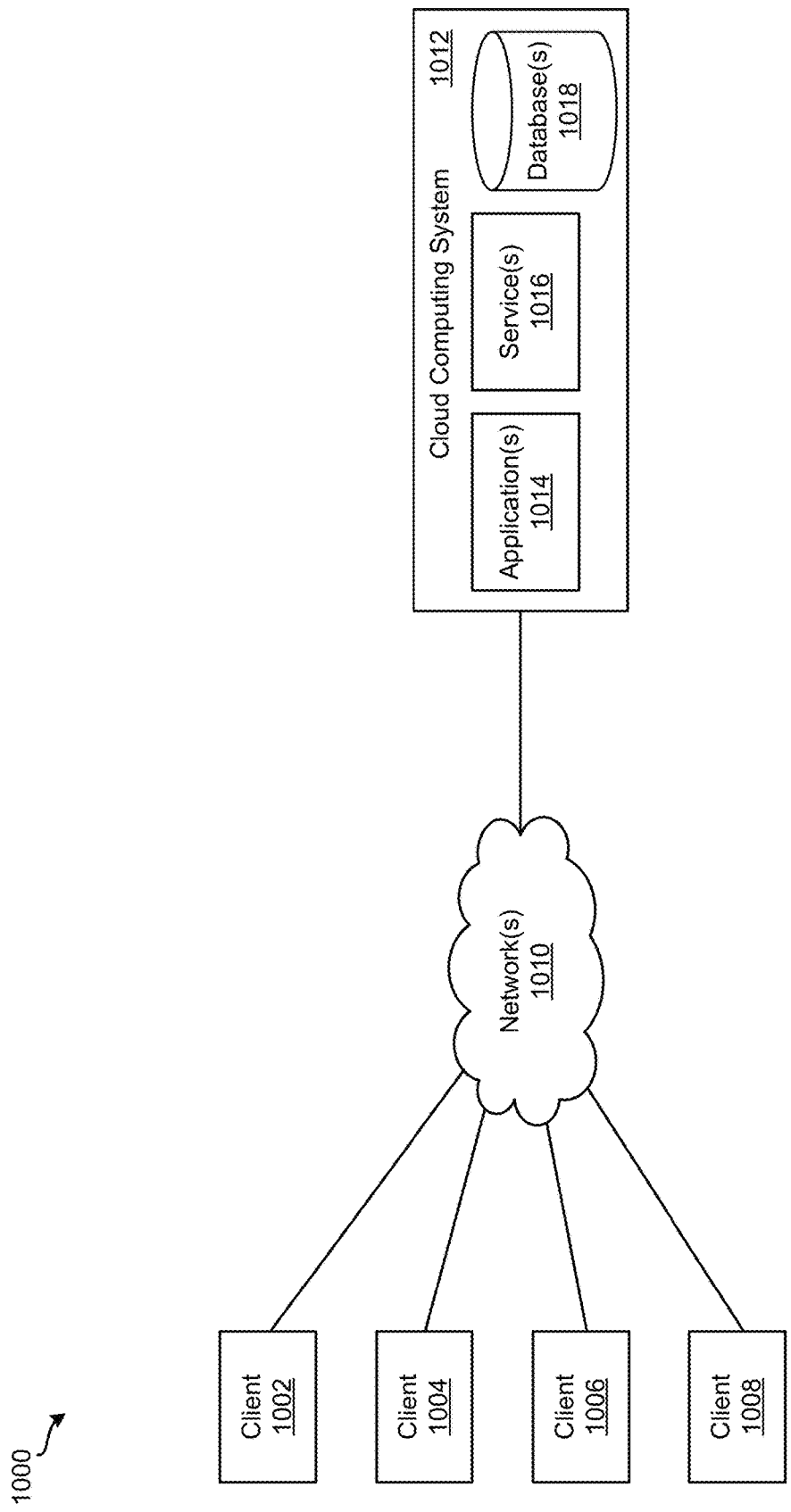
FIG. 10 illustrates an exemplary computing device, in which various embodiments may be implemented.

FIG. 10 illustrates an exemplary system 1000 for implementing various embodiments described above. For example, cloud computing system 1012 of system 1000 may be used to implement system 100. As shown, system 1000 includes client devices 1002-1008, one or more networks 1010, and cloud computing system 1012. Cloud computing system 1012 is configured to provide resources and data to client devices 1002-1008 via networks 1010. In some embodiments, cloud computing system 1000 provides resources to any number of different users (e.g., customers, tenants, organizations, etc.). Cloud computing system 1012 may be implemented by one or more computer systems (e.g., servers), virtual machines operating on a computer system, or a combination thereof.

As shown, cloud computing system 1012 includes one or more applications 1014, one or more services 1016, and one or more databases 1018. Cloud computing system 1000 may provide applications 1014, services 1016, and databases 1018 to any number of different customers in a self-service, subscription-based, elastically scalable, reliable, highly available, and secure manner.

In some embodiments, cloud computing system 1000 may be adapted to automatically provision, manage, and track a customer's subscriptions to services offered by cloud computing system 1000. Cloud computing system 1000 may provide cloud services via different deployment models. For example, cloud services may be provided under a public cloud model in which cloud computing system 1000 is owned by an organization selling cloud services and the cloud services are made available to the general public or different industry enterprises. As another example, cloud services may be provided under a private cloud model in which cloud computing system 1000 is operated solely for a single organization and may provide cloud services for one or more entities within the organization. The cloud services may also be provided under a community cloud model in which cloud computing system 1000 and the cloud services provided by cloud computing system 1000 are shared by several organizations in a related community. The cloud services may also be provided under a hybrid cloud model, which is a combination of two or more of the aforementioned different models.

In some instances, any one of applications 1014, services 1016, and databases 1018 made available to client devices 1002-1008 via networks 1010 from cloud computing system 1000 is referred to as a "cloud service." Typically, servers and systems that make up cloud computing system 1000 are different from the on-premises servers and systems of a customer. For example, cloud computing system 1000 may host an application and a user of one of client devices 1002-1008 may order and use the application via networks 1010.

Applications 1014 may include software applications that are configured to execute on cloud computing system 1012 (e.g., a computer system or a virtual machine operating on a computer system) and be accessed, controlled, managed, etc. via client devices 1002-1008. In some embodiments, applications 1014 may include server applications and/or mid-tier applications (e.g., HTTP (hypertext transport protocol) server applications, FTP (file transfer protocol) server applications, CGI (common gateway interface) server applications, JAVA server applications, etc.). Services 1016 are software components, modules, application, etc. that are configured to execute on cloud computing system 1012 and provide functionalities to client devices 1002-1008 via networks 1010. Services 1016 may be web-based services or on-demand cloud services.

Databases 1018 are configured to store and/or manage data that is accessed by applications 1014, services 1016, and/or client devices 1002-1008. For instance, storages 120-130 may be stored in databases 1018. Databases 1018 may reside on a non-transitory storage medium local to (and/or resident in) cloud computing system 1012, in a storage-area network (SAN), on a non-transitory storage medium local located remotely from cloud computing system 1012. In some embodiments, databases 1018 may include relational databases that are managed by a relational database management system (RDBMS). Databases 1018 may be a column-oriented databases, row-oriented databases, or a combination thereof. In some embodiments, some or all of databases 1018 are in-memory databases. That is, in some such embodiments, data for databases 1018 are stored and managed in memory (e.g., random access memory (RAM)).

Client devices 1002-1008 are configured to execute and operate a client application (e.g., a web browser, a proprietary client application, etc.) that communicates with applications 1014, services 1016, and/or databases 1018 via networks 1010. This way, client devices 1002-1008 may access the various functionalities provided by applications 1014, services 1016, and databases 1018 while applications 1014, services 1016, and databases 1018 are operating (e.g., hosted) on cloud computing system 1000. Client devices 1002-1008 may be computer system 900, as described above by reference to FIG. 9. Although system 1000 is shown with four client devices, any number of client devices may be supported.

Networks 1010 may be any type of network configured to facilitate data communications among client devices 1002-1008 and cloud computing system 1012 using any of a variety of network protocols. Networks 1010 may be a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A non-transitory machine-readable medium storing a program executable by at least one processing unit of a device, the program comprising sets of instructions for:
    identifying a first data structure having a first type, the first data structure configured to store a set of geometries;
    identifying a second data structure associated with the first data structure, the second data structure configured to store modifications to the set of geometries; and
    performing a merge operation on the first data structure and the second data structure to form a third data structure by:
    determining a first set of statistics data associated with the modifications to the set of geometries stored in the second data structure;
    retrieving a second set of statistics data associated with the set of geometries stored in the first data structure;
    determining a second type of data structure based on a storage cost value and a set of query performance cost values for each of a subset of a plurality of types of data structures identified based on the first and second sets of statistics data, wherein a defined weight value is applied to each query performance cost value in the set of query performance cost values;
    applying the modifications stored in the second data structure to the set of geometries stored in the first data structure to form a modified set of geometries;
    generating the third data structure having the second type, the third data structure configured to store the modified set of geometries; and
    storing the modified set of geometries in the third data structure.

2. The non-transitory machine-readable medium of claim 1, wherein determining the second type of data structure based on the first and second sets of statistics data comprises:
    identifying the subset of the plurality of types of data structures based on the first and second sets of statistics data;
    determining cost values for each type of data structure in the subset of the plurality of types of data structures based on the first and second sets of statistics data; and
    determining a type of data structure from the subset of the plurality of types of data structures as the second type of data structure based on the determined cost values.

3. The non-transitory machine-readable medium of claim 2, wherein the cost values for each type of data structure in the subset of the plurality of types of data structures comprises the storage cost value and the set of query performance cost values.

4. The non-transitory machine-readable medium of claim 1, wherein the modifications to the set of geometries comprises an addition of a geometry to the set of geometries.

5. The non-transitory machine-readable medium of claim 1, wherein the modifications to the set of geometries comprises a removal of a geometry from the set of geometries.

6. The non-transitory machine-readable medium of claim 1, wherein the first data structure is immutable.

7. A method comprising:
    identifying a first data structure having a first type, the first data structure configured to store a set of geometries;
    identifying a second data structure associated with the first data structure, the second data structure configured to store modifications to the set of geometries; and
    performing a merge operation on the first data structure and the second data structure to form a third data structure by:
    determining a first set of statistics data associated with the modifications to the set of geometries stored in the second data structure;
    retrieving a second set of statistics data associated with the set of geometries stored in the first data structure;
    determining a second type of data structure based on a storage cost value and a set of query performance cost values for each of a subset of a plurality of types of data structures identified based on the first and second sets of statistics data, wherein a defined weight value is applied to each query performance cost value in the set of query performance cost values;
    applying the modifications stored in the second data structure to the set of geometries stored in the first data structure to form a modified set of geometries;
    generating the third data structure having the second type, the third data structure configured to store the modified set of geometries; and
    storing the modified set of geometries in the third data structure.

8. The method of claim 7, wherein determining the second type of data structure based on the first and second sets of statistics data comprises:
    identifying the subset of the plurality of types of data structures based on the first and second sets of statistics data;
    determining cost values for each type of data structure in the subset of the plurality of types of data structures based on the first and second sets of statistics data; and
    determining a type of data structure from the subset of the plurality of types of data structures as the second type of data structure based on the determined cost values.

9. The method of claim 8, wherein the cost values for each type of data structure in the subset of the plurality of types of data structures comprises the storage cost value and the set of query performance cost values.

10. The method of claim 7, wherein the modifications to the set of geometries comprises an addition of a geometry to the set of geometries.

11. The method of claim 7, wherein the modifications to the set of geometries comprises a removal of a geometry from the set of geometries.

12. The method of claim 7, wherein the first data structure is immutable.

13. A system comprising:
    a set of processing units; and
    a non-transitory machine-readable medium storing instructions that when executed by at least one processing unit in the set of processing units cause the at least one processing unit to:

identify a first data structure having a first type, the first data structure configured to store a set of geometries;

identify a second data structure associated with the first data structure, the second data structure configured to store modifications to the set of geometries; and perform a merge operation on the first data structure and the second data structure to form a third data structure by:

determining a first set of statistics data associated with the modifications to the set of geometries stored in the second data structure;

retrieving a second set of statistics data associated with the set of geometries stored in the first data structure;

determining a second type of data structure based on a storage cost value and a set of query performance cost values for each of a subset of a plurality of types of data structures identified based on the first and second sets of statistics data, wherein a defined weight value is applied to each query performance cost value in the set of query performance cost values;

applying the modifications stored in the second data structure to the set of geometries stored in the first data structure to form a modified set of geometries;

generating the third data structure having the second type, the third data structure configured to store the modified set of geometries; and storing the modified set of geometries in the third data structure.

14. The system of claim 13, wherein determining the second type of data structure based on the first and second sets of statistics data comprises:

identifying the subset of the plurality of types of data structures based on the first and second sets of statistics data;

determining cost values for each type of data structure in the subset of the plurality of types of data structures based on the first and second sets of statistics data; and determining a type of data structure from the subset of the plurality of types of data structures as the second type of data structure based on the determined cost values.

15. The system of claim 14, wherein the cost values for each type of data structure in the subset of the plurality of types of data structures comprises the storage cost value and the set of query performance cost values.

16. The system of claim 13, wherein the modifications to the set of geometries comprises an addition of a geometry to the set of geometries.

17. The system of claim 13, wherein the modifications to the set of geometries comprises a removal of a geometry from the set of geometries.

* * * * *